(12) United States Patent
Hamers et al.

(10) Patent No.: US 10,526,014 B2
(45) Date of Patent: Jan. 7, 2020

(54) CONTROLLABLE SHOCK ABSORBER FOR MOTOR VEHICLES

(71) Applicants: ThyssenKrupp Bilstein GmbH, Ennepetal (DE); ThyssenKrupp AG, Essen (DE)

(72) Inventors: Wolfgang Hamers, Jülich (DE); Dmitrij Smeljanskij, Leverkusen (DE)

(73) Assignees: THYSSENKRUPP BILSTEIN GMBH, Ennepetal (DE); THYSSENKRUPP AG, Essen (DE)

( * ) Notice: Subject to any disclaimer, the term of this patent is extended or adjusted under 35 U.S.C. 154(b) by 0 days.

(21) Appl. No.: 15/523,719

(22) PCT Filed: Oct. 22, 2015

(86) PCT No.: PCT/EP2015/074446
§ 371 (c)(1),
(2) Date: May 2, 2017

(87) PCT Pub. No.: WO2016/071116
PCT Pub. Date: May 12, 2016

(65) Prior Publication Data
US 2017/0313355 A1    Nov. 2, 2017

(30) Foreign Application Priority Data

Nov. 7, 2014  (DE) .................. 10 2014 116 264

(51) Int. Cl.
*F16F 9/348* (2006.01)
*B62D 21/11* (2006.01)
(Continued)

(52) U.S. Cl.
CPC .............. *B62D 21/11* (2013.01); *F16F 9/348* (2013.01); *F16F 9/3482* (2013.01); *F16F 9/446* (2013.01); *F16F 9/516* (2013.01)

(58) Field of Classification Search
CPC .......... F16F 9/3214; F16F 9/34; F16F 9/3405; F16F 9/348; F16F 9/3481; F16F 9/3482; F16F 9/516
See application file for complete search history.

(56) References Cited

U.S. PATENT DOCUMENTS 4,953,671 A * 9/1990 Imaizumi ................ F16F 9/464
                                                              188/266.3
5,810,127 A * 9/1998 Schmidt ................... F16F 9/464
                                                              188/282.2

(Continued)

FOREIGN PATENT DOCUMENTS

DE    3631107 A    3/1988
DE    3704712 A    8/1988

(Continued)

OTHER PUBLICATIONS

English translation of International Search Report issued in PCT/EP2015/074446, dated Jan. 21, 2016 (dated Feb. 2, 2016.

(Continued)

*Primary Examiner* — Nicholas J Lane
(74) *Attorney, Agent, or Firm* — thyssenkrupp North America, Inc.

(57) ABSTRACT

A regulable vibration damper, which may be utilized in a vehicle chassis, for example, may comprise a cylinder barrel that contains hydraulic fluid in sealed-off fashion, a piston that is axially movable within the cylinder barrel along a cylinder barrel axis and that divides the cylinder barrel into two working chambers, and a piston rod oriented parallel to the cylinder barrel axis and that is connected to the piston. The piston may comprise at least two fluid leadthroughs that connect the working chambers. A first valve assembly for damping piston movement in a first actuation direction may be arranged at a first fluid leadthrough, and a second valve assembly for damping piston movement in a second actua- (Continued)

tion direction may be arranged at a second fluid leadthrough. In the piston, one or more bypass ducts with throughflow cross sections of different size for the two throughflow directions may form fluidic connections between the two working chambers that bypass the vestibules.

12 Claims, 4 Drawing Sheets

(51) Int. Cl.
 *F16F 9/516* (2006.01)
 *F16F 9/44* (2006.01)

(56) References Cited

U.S. PATENT DOCUMENTS

| | | | | |
|---|---|---|---|---|
| 6,311,812 | B1 | 11/2001 | Sonsterod et al. | |
| 6,318,523 | B1 * | 11/2001 | Moradmand | F16F 9/3482 188/280 |
| 6,474,454 | B2 * | 11/2002 | Matsumoto | F16F 9/3484 188/282.6 |
| 9,016,447 | B2 * | 4/2015 | De Lillo | B60G 13/06 188/282.4 |
| 2004/0069581 | A1 | 4/2004 | Shinata | |
| 2005/0056505 | A1 * | 3/2005 | Deferme | F16F 9/3485 188/322.15 |
| 2008/0000739 | A1 * | 1/2008 | Behmenburg | B60G 17/08 188/322.15 |
| 2008/0314704 | A1 * | 12/2008 | Deferme | F16F 9/3481 188/266 |
| 2013/0180813 | A1 * | 7/2013 | Moore, Jr. | B60G 13/06 188/282.6 |
| 2014/0262655 | A1 * | 9/2014 | Tuts | F16F 9/348 188/322.15 |
| 2016/0312851 | A1 * | 10/2016 | Hamers | F16F 9/465 |

FOREIGN PATENT DOCUMENTS

| | | |
|---|---|---|
| DE | 19509853 A | 9/1995 |
| DE | 1441047 C | 1/1996 |
| DE | 19513470 A | 1/1996 |
| DE | 19650152 C | 2/1998 |
| DE | 10059707 A | 7/2001 |
| DE | 10104640 C | 5/2002 |
| DE | 60116687 T | 9/2006 |
| DE | 102013114169 A | 6/2015 |
| EP | 0405123 B | 1/1991 |
| GB | 2222227 A | 2/1990 |
| JP | 3128704 B | 1/2001 |
| WO | 2010122102 A | 10/2010 |

OTHER PUBLICATIONS

English abstract of DE19509853A.
English abstract of EP0405123A.
English abstract of DE3704712A.
English abstract of JP3128704A.
English abstract of DE3631107A.
English abstract of DE19513470A.
English abstract of DE60116687T.
English abstract of DE10059707A.
English abstract of DE4441047C.
English abstract of DE10104640C.
English abstract of DE102013114169A.

* cited by examiner

CONTROLLABLE SHOCK ABSORBER FOR MOTOR VEHICLES

CROSS REFERENCE TO RELATED APPLICATIONS

This application is a U.S National Stage Entry of International Patent Application Serial Number PCT/EP2015/074446, filed Oct. 22, 2015,which claims priority to German Patent Application No. DE 10 2014 116 264.1 filed Nov. 7, 2014,the entire contents of both of which are incorporated herein by reference.

FIELD

The present disclosure generally relates to regulable vibration dampers.

BACKGROUND

A vibration damper of said type is known from DE 44 41 047 C1. On a piston guided axially within a cylinder barrel, there are provided pressure-dependent damping valves for an exchange of fluid between two working chambers in the rebound phase and in the compression phase. A pilot controller acts such that a controllable pressure is built up in pilot-control chambers. The pilot-control pressure forces the valve disks of the damping valves into their closed position. By means of a bypass duct system, fluid is conducted out of the working chambers into the pilot-control chambers, and thus the pressure there is increased. The pilot-control pressure is regulated by means of an externally adjustable pilot-control valve arranged in the bypass duct system. An elastic element forms the partition between the pilot-control chamber and the working chamber.

A further vibration damper, which operates in accordance with the same principle, is known from DE 101 04 640 C1. In this, the pilot-control chambers are formed by pressure chambers. Said pressure chambers are formed by in each case one pressure chamber housing and one seal, which lies in movable fashion against a damping valve. A pilot-control valve controls the pressure in the pilot-control chambers. An outlet of the pilot-control valve opens into the working chambers.

The valve disks generally impart a degressive damping characteristic to the vibration damper at high piston speeds in the case of which a lift-off of the valve disks from the valve seat occurs. Here, the opening cross section becomes larger with increasing speed, which gives rise to the degressive characteristic.

In parallel with the damping by means of the valve disks, one or more bypass ducts in the piston form a throttle between the working chambers, which throttle imparts a progressive component to the damping characteristic of the vibration damper. The influence of said progressive component is of relevance in particular at low piston speeds in the case of which the valve disks still bear fully against the valve seat. Such a bypass duct may be formed by means of a notch in the valve disk or in the valve seat, such that a flow through the fluid leadthroughs from one working chamber into the other working chamber is possible despite the valve disks bearing fully against the valve seat. However, a bypass duct of said type basically acts in both throughflow directions, such that, as a result, the progressive component can be set only to the same extent for both throughflow directions.

The dimensioning of the bypass cross sections through the notches on the valve disk or the valve seat necessitate adapted valve disks or pistons, which makes it necessary to stock a high number of different disks and pistons.

WO 2010/122102 A1 discloses a vibration damper which is intended to be distinguished by particularly smooth opening of the valve disks. For the compression and rebound side, multiple valve seat regions are formed in each case for one valve disk, which valve seat regions can be supplied with hydraulic fluid to varying degrees. In the steady state, the same hydraulic pressure prevails at all valve seat regions, such that the valve disk opens quickly in the event of further pressurization. In the dynamic state, the pressure cannot be maintained in some valve seat regions owing to a relatively small inflow cross section of the associated hydraulic duct. Said valve seat regions thus duly assist a fast opening of the valve disk; it is then the case that, when the disk is open, said valve seat regions have no influence or only little influence on the further opening of the valve. The vibration damper does not provide any bypass ducts in the piston.

It is an object of the present invention to further develop the generic vibration damper such that the damping characteristics at low piston speeds can be set separately for the two throughflow directions in an extremely simple manner.

DETAILED DESCRIPTION

Figure 1:
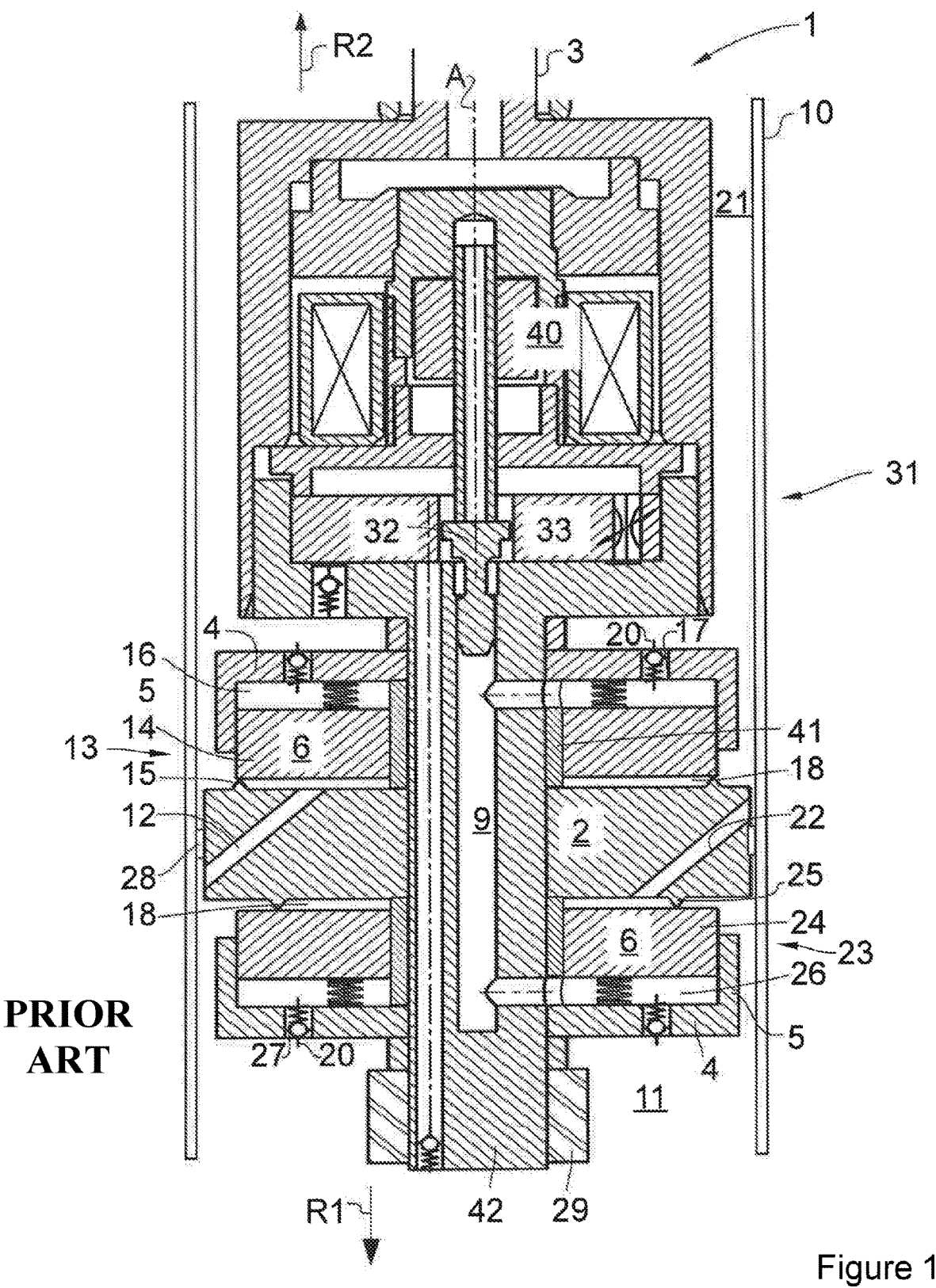
FIG. 1 is a cross-sectional view of a valve assembly of part of a conventional vibration damper.

Although certain example methods and apparatus have been described herein, the scope of coverage of this patent is not limited thereto. On the contrary, this patent covers all methods apparatus, and articles of manufacture fairly falling within the scope of the appended claims either literally or under the doctrine of equivalents. Moreover, those having ordinary skills in the art will understand that reciting 'a'element or 'an'element in the appended claims does not restrict those claims to articles, apparatuses, systems, methods, or the like having only one of that element, even where other elements in the same claim or different claims are preceded by "at least one "or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The object on which the invention is based is achieved by means of a regulable vibration damper, in particular for a vehicle chassis, comprising a cylinder barrel which comprises a hydraulic fluid received therein in sealed-off fashion, comprising a piston which is axially movable within the cylinder barrel along a cylinder barrel axis and which divides the cylinder barrel into two working chambers, comprising a piston rod which is oriented parallel to the cylinder barrel axis and which is connected to the piston, wherein the piston comprises at least two fluid leadthroughs by means of which one working chamber is connected to the other working chamber, wherein a first valve assembly for damping the piston movement in a first actuation direction is arranged at a first fluid leadthrough, and wherein a second valve assembly for damping the piston movement in a second actuation direction is arranged at a second fluid leadthrough, wherein each valve assembly comprises at least one valve disk which, in a closed valve position, is seated on a valve seat and thus at least partially covers the associated fluid leadthrough and which, in an open valve position, is at least partially spaced apart from the valve seat. The valve seat, the associated valve disk and the piston in each case delimit a vestibule into which the respective fluid leadthrough leads to an outlet side. According to the invention, it is now the case that, in the piston, in addition to the fluid leadthroughs, there is provided a bypass duct with throughflow cross sections of different size for the two throughflow directions, or there are provided multiple bypass ducts, the throughflow cross sections of which are, in sum total, of different size for the two throughflow directions. By means of the single bypass duct, a fluidic connection, or by means of the multiple bypass ducts, multiple fluidic connections, is or are formed between the two working chambers, bypassing the two vestibules.

By means of this arrangement, it is possible to realize different bypass cross sections without the need for a special design of the valve disks or of the valve seat. As a piston, it is thus possible to use a standard piston without application-specific notches in the valve seats; also, as valve disks, use may now be made of standard disks without application-specific notches or other passages. It is thus possible, by means of the different throughflow cross sections of the bypass ducts, for the damping characteristics of the vibration damper, in particular for low piston speeds, to be set separately for the two throughflow directions.

It is preferably provided that an opening of the single bypass duct or of the several bypass ducts is at least partially covered by a non-return disk which is formed separately from the valve disks. Instead of the valve disks, it is thus the case that a specific non-return disk serves for setting a defined bypass duct inlet cross section through which flow can pass freely. Since the non-return disk generates a cross-section reduction of the bypass duct only in one throughflow direction, the throughflow cross sections can be set separately for the two throughflow directions through selection of suitable non-return disks. Such non-return disks may be formed from plastic, and can therefore be produced very inexpensively.

It is preferably provided that the throughflow cross sections of different size for the two throughflow directions are realized by virtue of an opening of the bypass duct or openings of the bypass ducts at the two sides of the piston being covered to different extents by corresponding non-return disks. This means that those openings (or only a single opening) of the bypass duct which face(s) toward one working chamber are covered by a non-return disk to a different extent than the other openings (or only a single opening), which face(s) toward the other working chamber. By means of the varying degree of the coverage of the openings, it is possible for the free inflow cross section and thus also the flow resistance or the pressure loss that arises during throughflow to be set individually for both throughflow directions. In the context of the invention, sides of the piston are to be understood to mean the piston-rod-facing side and the piston-rod-averted side of the piston. The piston-rod-facing side in this case faces toward the piston-rod-facing working chamber, whereas the piston-rod-averted side faces toward the piston-rod-averted working chamber.

This mode of operation is preferably furthermore realized in that, at one of the sides of the piston, there is provided an inlet opening of the first or second fluid passage, which inlet opening is surrounded by one of the valve seats, and that, at said side of the piston, there is provided an inlet opening of the bypass, which inlet opening is not surrounded by the valve seat. For the inflow of the fluid into the bypass duct, it is therefore not necessary for a flow to pass through the valve seat and thus through the vestibule. This applies in particular also to all inlets of possibly several bypass ducts.

It is preferable for a non-return disk for limiting the throughflow cross section of the bypass duct to be arranged coaxially and axially offset with respect to a valve disk, wherein the non-return disk and the valve disk are arranged at the same side of the piston. The non-return disk can thus be easily installed. Furthermore, through the use of such disks, the vibration damper can be easily adapted for other applications. It is however not necessary for the non-return disk to completely cover the inlet of the bypass duct; partial coverage is sufficient for a reduction of the bypass cross section.

It is preferably provided that, on one side (the piston-rod-facing side and/or the piston-rod-averted side) of the piston, multiple circumferential regions are formed in a manner distributed in a circumferential direction, of which circumferential regions at least a first region is surrounded by a valve seat and at least a second region is not surrounded by the valve seat. The openings of the fluid passages and/or those of the bypass ducts may be arranged in the second, non-surrounded region, such that the bypassing of the vestibules is realized. The outlets of the fluid passages are arranged in the first, surrounded region, such that the fluid passages open into the vestibules.

It is preferably the case that the throughflow cross section is reduced, at least in one throughflow direction, by a non-return disk, wherein the non-return disk comprises at least one, preferably multiple, radially projecting bypass flaps. The bypass flaps partially reduce the cross section, through which flow can pass freely, of the bypass duct. By means of the geometrical design of the bypass flaps, the cross section, through which flow can pass freely, of the bypass duct can be set, and thus the pressure loss that arises as flow passes through can be adjusted. The number of bypass flaps of one/multiple non-return disk/non-return disks corresponds at least to the number of bypass duct inlet openings to be covered. As flow passes through in the respective throughflow directions, it is thus the case that pressure losses of different magnitude are set in the two throughflow directions if the bypass ducts are covered to different extents by the bypass flaps.

Here, the non-return disk is preferably designed such that the non-return disk can be mounted selectively by means of both sides on the piston such that the single bypass flap or the multiple bypass flaps reduce(s) the throughflow cross section of the bypass duct or the throughflow cross sections of the bypass ducts. This may be realized by means of the arrangement of an even number, in particular two or four, bypass flaps, wherein major parts of the bypass flaps may be arranged rotationally symmetrically with respect to one another about an axis of rotation. In this way, the installation process can be considerably simplified, because the non-return disk can be installed in any orientation. Incorrect installation can be virtually ruled out.

It is preferably provided that, on the bypass flaps, there are formed abutment surfaces for the correct orientation of the non-return disk with respect to a positioning element of the piston. In this way, installation in the correct position relative to the piston is promoted.

The invention can be used in particular in the case of vibration dampers in which each valve assembly comprises a pilot-control chamber, wherein the valve disk can be preloaded into the closed valve position by pressurization of the pilot-control chamber, wherein the pressure in the respective pilot-control chambers can be set by means of at least one pilot-control valve. In the case of such vibration dampers, by means of the claimed arrangement, a possible pressure build-up at the inlets of the bypass ducts owing to the bypassing of the vestibules does not have an effect on the pressure pattern in the vestibules. It can thus be ensured that the pressure in the vestibules is, as before, influenced primarily by the pressure in the pilot-control chambers and self-evidently the piston speed. Falsification owing to the throttling action of the bypass ducts is avoided.

FIG. 1 shows the detail of a conventional vibration damper 1, such as is described in the German patent application 10 2013 114 169.2, which has not yet been published.

The vibration damper 1 comprises a cylinder barrel 10 in which a piston 2 is held so as to be displaceable along a cylinder barrel axis A. The piston 2 comprises a ring-shaped seal 28 on its outer circumference, such that the piston 2 divides the cylinder barrel 10, with sealing action, into a first (piston-rod-averted) working chamber 11 and a second (piston-rod-facing) working chamber 21. The piston 2 is fastened to a fastening journal 42, which in turn is fixedly connected to a piston rod 3. In the event of actuation of the piston rod 3 in a first actuation direction R1 toward the first working chamber 11 (also referred to as "compression direction"), the pressure in the first working chamber 11 increases. Fluid which is present in the first working chamber 11 then flows through a first fluid leadthrough 12 in the piston 2 into the second working chamber 21. The fluid leadthrough leads to the piston rod side into a vestibule 18, which is separated from the second working chamber 21 by the associated valve seat 15 and the valve disk 16. During the delivery of fluid through the first fluid leadthrough 12, the fluid flows through a first valve assembly 13 with a pressure-limiting valve 14. The pressure-limiting valve 6 may be formed for example from one or more flexible valve disks 14. When a minimum pressure of the fluid is attained in the first working chamber 11, the first pressure-limiting valve 14, which is seated with preload on a first valve seat 15, is at least partially lifted from the first valve seat 15. Thus, the valve disk 14 is transferred from the closed position into the open position in which it is raised from the valve seat. A hydraulic connection is thus produced between the first working chamber 11 and the second working chamber 21. Here, the first pressure-limiting valve 14 generates the damping force in interaction with the first valve seat 15.

The pressure-limiting valve 14 is forced in the direction of the valve seat 15 by a pressure prevailing in a pilot-control chamber 16 (hereinafter referred to as "pilot-control pressure"). Said pilot-control pressure in the first pilot-control chamber 16 can be set in a defined manner during operation. It is clear that, the higher the pressure in the first pilot-control chamber 16, the higher the damping force provided by the first valve assembly 13. This is because a correspondingly higher pressure has to be built up in the vestibule 18 in order to lift the pressure-limiting valve 14 from the valve seat 15.

The vibration damper 1 furthermore comprises a second valve assembly 23, which is of identical design to the first valve assembly 13. The second valve assembly is provided for retarding the flow of the fluid when the piston 2 is moved in a second actuation direction R2 (also referred to as "rebound direction"). In this case, the fluid flows from the second working chamber 21 via a second fluid leadthrough 22 into the first (piston-rod-averted) working chamber 11. A second pilot-control chamber 26 is likewise formed by a base 4, a cylindrical side wall 5 and a second valve disk 24 of a second pressure-limiting valve 6. The second valve disk 24 and a second valve seat 25 and the arrangement of the vestibule 18 are identical to those in the first valve assembly 13.

The two bases 4 each comprise fluid leadthroughs 17 and 27 respectively and check valves 20. If the piston 2 is moved in the compression direction R1, damping fluid flows out of the piston-rod-averted working chamber 11 through the fluid leadthrough 27 into the second pilot-control chamber 26. If the piston 2 is moved in the rebound direction R2, damping fluid flows out of the piston-rod-facing working chamber 21 through the fluid leadthrough 17 into the first pilot-control chamber 16.

The two pilot-control chambers 16, 26 are hydraulically connected to one another by means of a connecting leadthrough 9. The connecting leadthrough 9 comprises an axial bore in the fastening journal 42, and two radial connecting bores in the fastening journal 42, which radial connecting bores connect the axial bore and the pilot-control chambers 16, 26 to one another. It is substantially the case that the same pressure prevails at all times in both pilot-control chambers 16, 26. If the piston 2 is now moved in the first actuation direction R1, the pressure in the first working chamber 11 increases, and the damping fluid flows through a fluid leadthrough 27 between the first working chamber 11 and the second pilot-control chamber 26 from the first working chamber 11 into the second pilot-control chamber 26, whereby the pilot-control pressure in the second pilot-control chamber 26 is increased. The pilot-control pressure built up in the second pilot-control chamber 26 also propagates through the connecting leadthrough 9 into the first pilot-control chamber 16. In this way, the pilot-control pressure is generated in the first pilot-control chamber 16, by means of which the damping characteristics of the first valve assembly 13 are influenced. The same applies to the actuation in the second actuation direction R2. In this case, the fluid flows from the second working chamber 21 through a fluid leadthrough 17 between the second working chamber 21 and the first pilot-control chamber 16 into the first pilot-control chamber 16. The pilot-control pressure thus generated in the first pilot-control chamber 16 in turn propagates through the connecting leadthrough 9 into the second pilot-control chamber 26. In order that the fluid cannot flow through the fluid leadthroughs 17, 27 from the first pilot-control chamber 16 directly into the second working chamber 21 or from the second pilot-control chamber 26 into the first working chamber 11, one-way valves 20 are fitted in each of the fluid leadthroughs 17, 27, which one-way valves are for example in the form of non-return valves.

The pilot-control pressure in the two pilot-control chambers 16 and 26 can be regulated. For this purpose, a pilot-control valve 31 is provided which comprises a valve body 32. The valve body is held so as to be movable along the cylindrical barrel axis A, and may be seated on a valve seat 33 which is static (in relation to the fastening journal). When the valve body 32 is seated on the valve seat 33, an outflow of fluid through the pilot-control valve 31 is substantially prevented. During such a phase, the pilot-control pressure can be built up or maintained. If the valve body 32 is lifted from the valve seat 33, fluid can flow out of the connecting leadthrough through the pilot-control valve 31; in this phase, the pilot-control pressure can be reduced. Here, the valve body 32 is forced in the first actuation direction R1 by means of a magnetic actuator 40. The valve body 32 is forced in the second actuation direction R2 by the pilot-control pressure. The position of the valve body 32 relative to the valve seat 33 is defined in a manner dependent on the force conditions resulting from the magnetic actuator 40 and the pilot-control pressure.

Conventionally, the valve disks 16, 26 and/or valve seats 15, 25 are equipped with notches or bores so as to realize a free throughflow cross section which is not covered by the valve disk 14 or the valve seat 15. In this way, a bypass cross section is set in defined fashion, which can be used for configuring the damping characteristics. However, the abovementioned measures yield merely a bypass cross section which is the same for both stages, that is to say for the compression stage and for the rebound stage. In some applications, it is however desirable for bypass cross sections in the compression stage to be configured differently from those in the rebound stage. It would duly be possible to realize this by means of one-way valves within the fluid leadthrough 12, 22 in the piston 2. However, if a one-way valve of said type is present in the fluid leadthrough, this would result in a pressure build-up in the upstream vestibule 18. Said pressure build-up in the vestibule however in turn has an effect on the pilot-control chambers 16, 26 and increases the pressure there, despite the fact that an unpressurized phase is presently prevailing there. This leads to a malfunction in the regulation of the pressure in the pilot-control chamber, such that said possibility is not realized.

Figure 2:
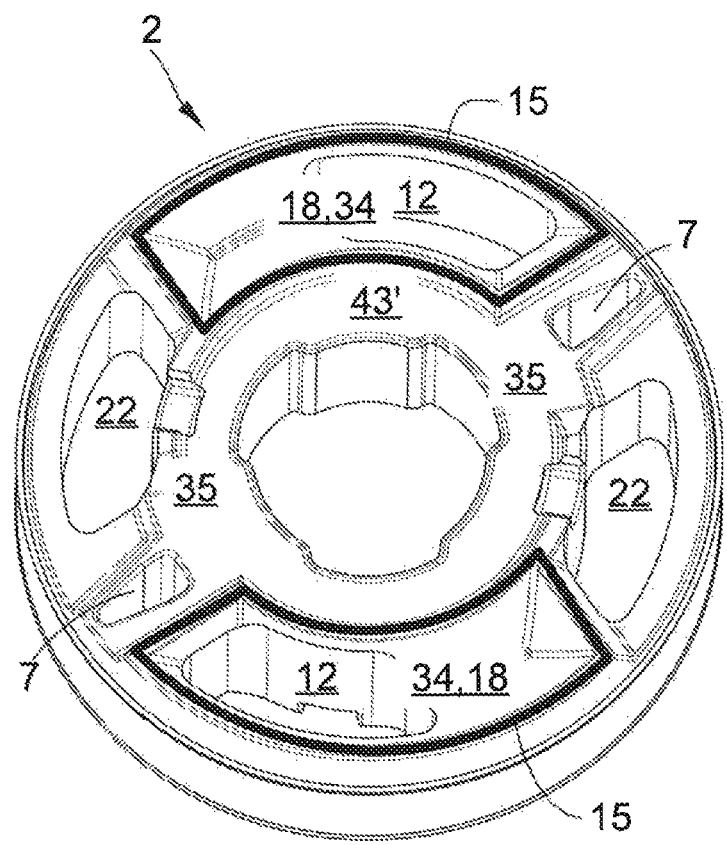
FIG. 2 is a perspective view of an example piston of an example vibration damper.

The vibration damper according to the invention now comprises a piston 2 as described on the basis of FIGS. 2 to 6. FIG. 2 shows the piston 2 in a detail. In addition to the fluid leadthroughs 12, 22, two further apertures are provided between the two sides of the piston 2, which apertures each form a bypass duct 7.

Figure 3:
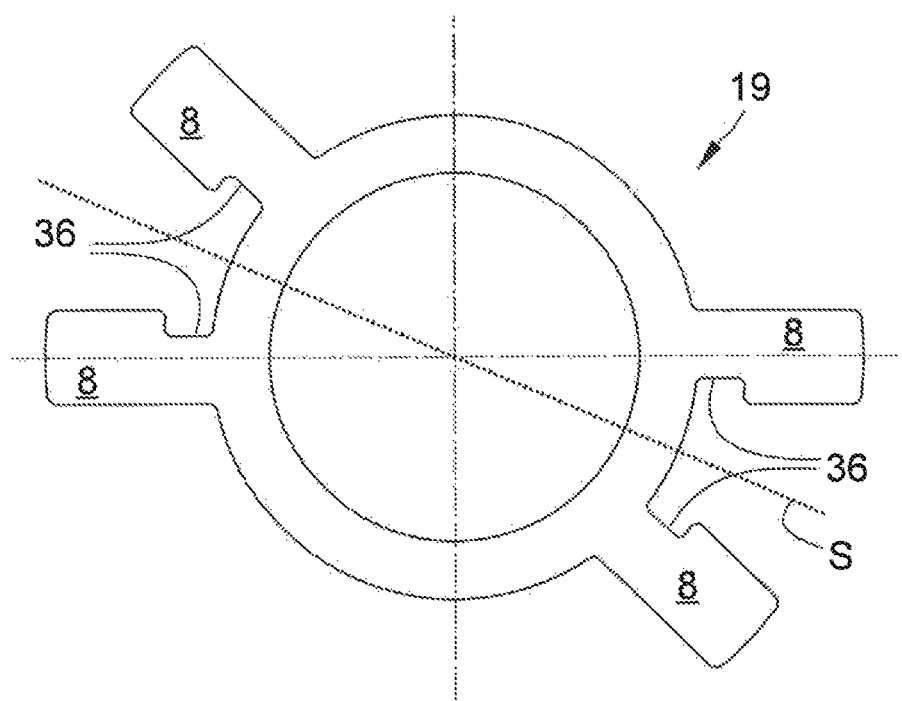
FIG. 3 is a plan view of an example non-return disk of an example vibration damper.

A bypass duct 7 of said type is at least partially covered by a non-return disk 19, which is shown as a detail in FIG. 3. The non-return disk comprises multiple bypass flaps 8, which can each be pivoted away in exactly one direction when said non-return disk is laid on a corresponding opening of the bypass ducts 7. A non-return disk $19_O$ of said type is laid on the top of the piston 2; a further non-return disk $19_U$ is laid on the bottom of the piston 2. In each case two bypass flaps 8 of the respective non-return disk 19 in this case partially cover the two openings of the bypass duct 7, as shown for the top side in FIG. 4 and also in cross section for both sides in FIG. 5.

Figure 5:
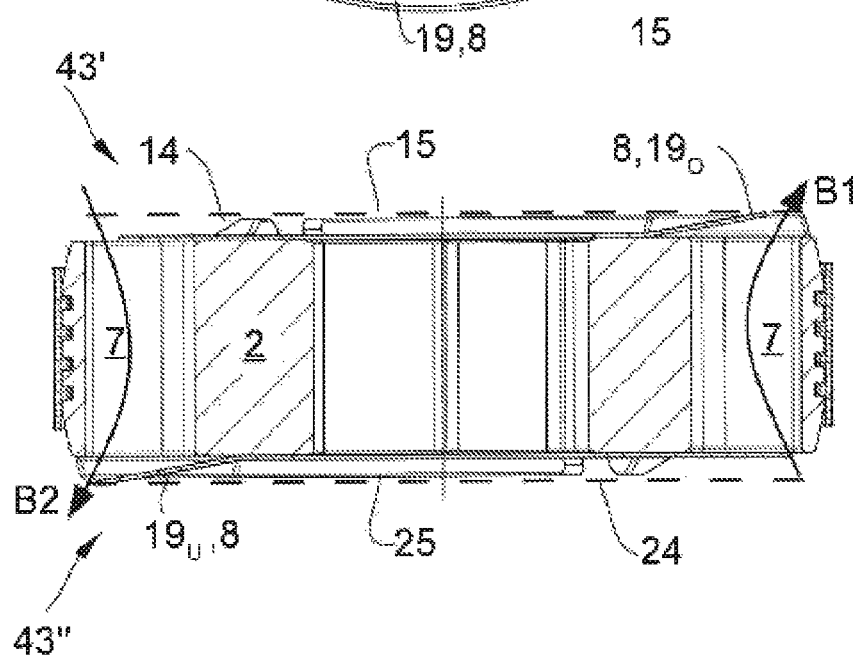
FIG. 5 is a cross-sectional view of the example arrangement of FIG.4.

If, as can be seen on the right-hand side in FIG. 5, fluid now flows through the bypass ducts from the bottom upward (first throughflow direction B1), the bypass flaps 8 of the upper non-return disk $19_O$ pivot away upward, and do not reduce the throughflow cross section of the bypass ducts in said flow direction. However, if, as can be seen on the left-hand side in FIG. 5, fluid flows through the bypass ducts 7 from the top downward (second throughflow direction B2), the bypass flaps 8 of the upper non-return disk $19_O$ at least partially block the opening, and reduce the throughflow cross section of the bypass ducts in said flow direction. This is because the bypass flaps 8 can duly be pivoted away from the piston but not in the direction toward the piston 2.

Correspondingly, the bypass flaps 8 of the lower non-return disk $19_U$ pivot away downward and do not reduce the throughflow cross section of the bypass ducts if fluid flows in the second flow direction B2. However, if fluid flows through the bypass ducts 7 in the first throughflow direction B1, the bypass flaps 8 of the lower non-return disk $19_U$ at least partially block the opening and reduce the throughflow cross section of the bypass ducts.

Figure 6:
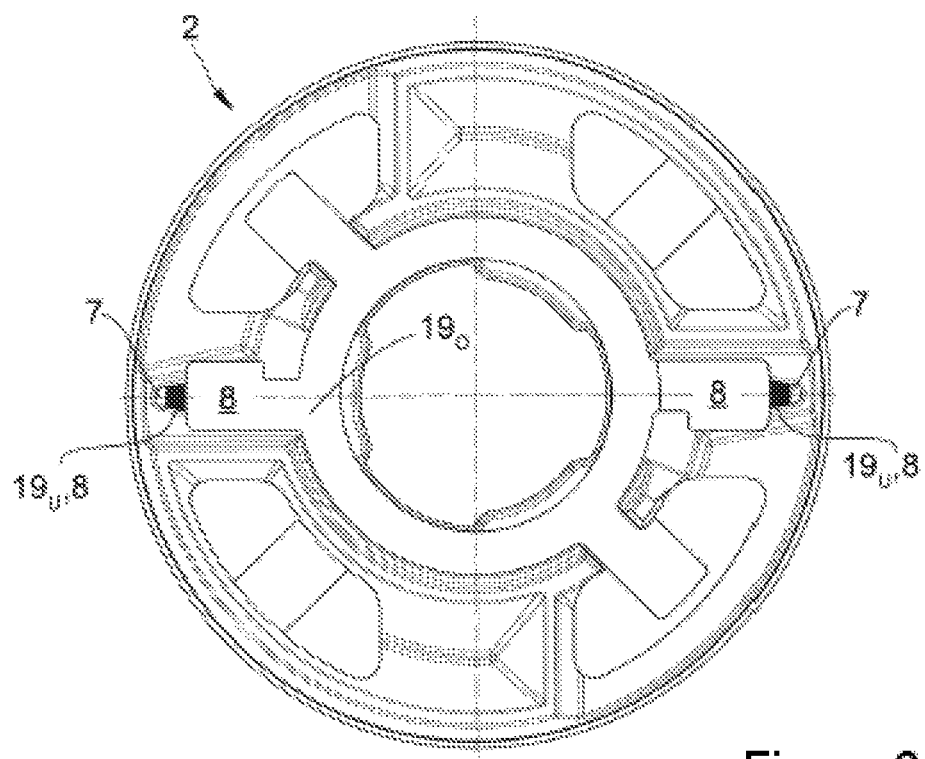
FIG. 6 is a plan view of the example arrangement of FIG.4.

By means of the different designs of the upper and lower bypass flaps 8, it is possible for the throughflow cross sections of the bypass ducts for different throughflow directions to be set separately from one another. In this regard, FIG. 6 shows the piston 2 from above. It is possible to clearly see the upper non-return disk $19_O$; the lower non-return disk $19_U$ is less clearly visible, because it is for the most part concealed by the piston 2 and the upper non-return disk $19_O$. Therefore, the visible part of the lower non-return disk $19_U$ is highlighted in black in this figure. The bypass flaps 8 of the lower non-return disk $19_U$ are larger than the bypass flaps 8 of the upper non-return disk $19_O$, which yields the smaller throughflow cross section in the first throughflow direction B1 (out of the plane of the drawing).

In order that the pressure build-up caused by the bypass flap 8 does not propagate into the vestibules 18, it is now provided (as shown in FIG. 2) that, on the sides of the piston 2, there are formed both first regions 34, which are surrounded by the valve seat 15 (illustrated here with a bold outline), and second regions, that is to say the remaining regions 35, which are not surrounded by the valve seats 15. Said first regions 34 surrounded by the valve seat 15 define the position of the vestibules 18 at the sides of the piston 2; the fluid leadthroughs 12, 22 open, downstream, into said vestibules 18 or first regions 34. The fluid leadthroughs 12, 22 open at the inlet side, that is to say upstream, at the other, second regions 35 of the side, which regions are not surrounded by the valve seat 15. Furthermore, the inlets and outlets of the bypass ducts 7 also open into the second regions 35. In this respect, the inlets of the bypass duct 7 can now communicate directly with working chambers 11, 21 positioned upstream in the bypass flow direction, without the bypass volume flow passing through the vestibule 18.

FIG. 5 shows the axial arrangement of the non-return disks 19 in relation to the valve seats 15, 25 and the valve disks 14, 24. The positions of the valve disks 14, 24 are indicated by the dashed lines. The valve disks 14, 24 bear against the elevated region formed by the valve seats 15, 25. The valve disks are, in relation to a piston central point, arranged axially further to the outside than the non-return disk 19 arranged in each case on the same side of the piston 2.

Figure 4:
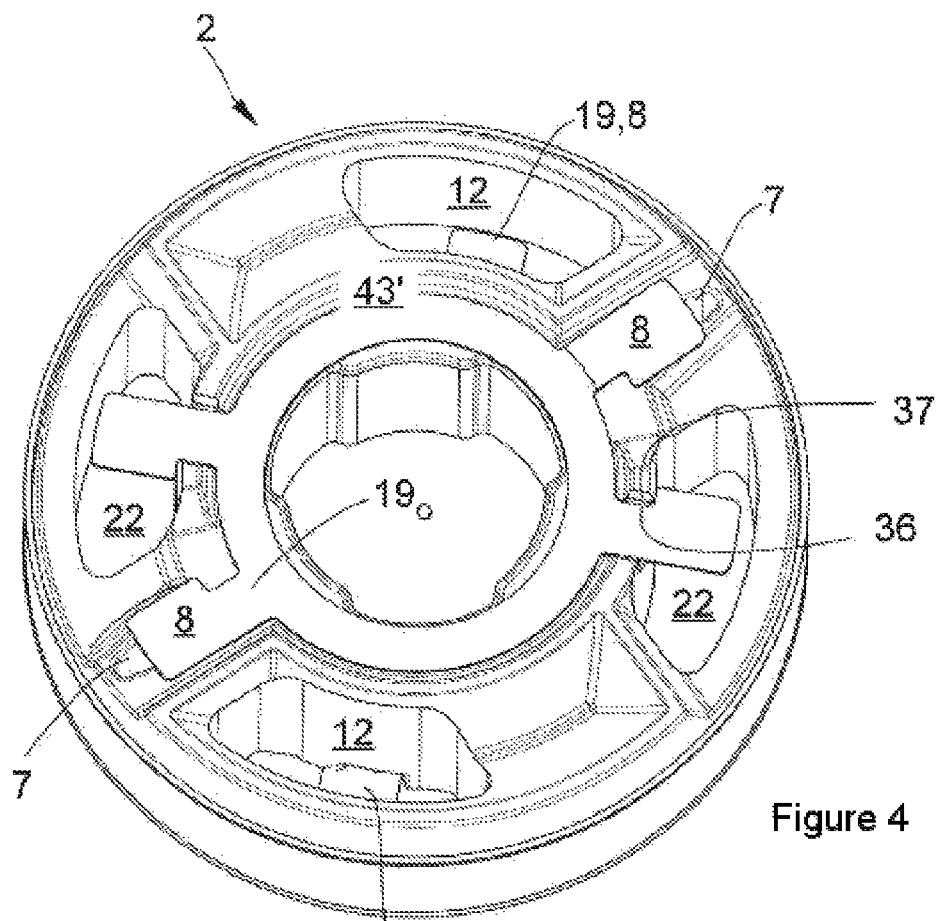
FIG. 4 is a perspective view of the example piston of FIG.2 with two non-return disks mounted thereon.

FIG. 4 shows a top side of the piston 2 with non-return disk 19 lying thereon. The non-return disk 19 comprises four bypass flaps 8, even though the piston 2 comprises only two bypass ducts 7 to be covered. Two of the bypass flaps 8 cover in each case one bypass duct 7; two others cover regions of outlets of the fluid leadthroughs 12, 22, though this does not have a significant influence owing to the large cross section of the fluid leadthroughs 12, 22, especially as said two bypass flaps 8 can in this case be pivoted away by the flow in both directions. The result is a rotationally symmetrical x-shaped arrangement of the bypass flaps 8 in relation to an imaginary axis of rotation S (FIG. 3). This embodiment makes it possible for the non-return disk 19 to always be installed correctly regardless of the orientation of the non-return disk 19. The non-return disk 19 can thus be laid on the piston 2 even in a reversed orientation. This is correspondingly the case with regard to the arrangement of the non-return disk on the bottom side of the piston 2.

Furthermore, the non-return disk 19 comprises defined abutment surfaces 36 (FIGS. 3 and 4) in the region of the bypass flaps 8, which abutment surfaces in turn interact with defined abutment surfaces 37 on the piston (FIG. 3) in order to define the exact position and orientation relative to the piston. Since the defined abutment surfaces 36 are provided on all four bypass flaps 8, incorrect insertion of the non-return disk 19 is not possible. The abutment surfaces 36 on the non-return disk 19 act, in interaction with the abutment surfaces 37 on the piston, as a stop for correct positioning in the radial direction and in the circumferential direction.

Figure 7:
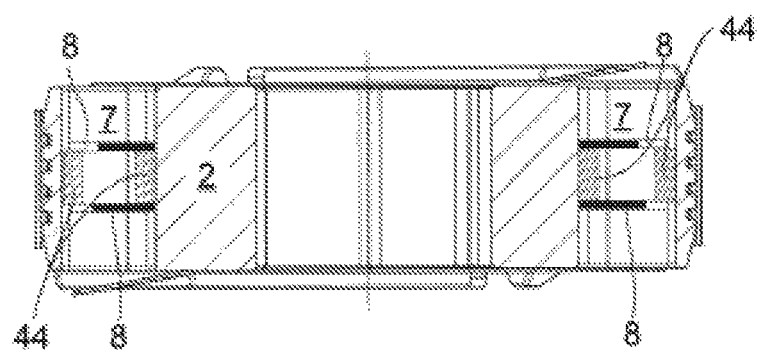
FIG. 7 is a cross-sectional view of another example piston, with example bypass flaps arranged in a bypass duct.

FIG. 7 shows an alternative embodiment of the present invention. By contrast to the embodiment described above, the bypass flaps 8 in this case do not cover an inlet of the bypass duct 7; rather, the bypass flaps 8 are arranged inside the bypass duct 7. In the bypass duct 7, the bypass flaps 8 lie on an abutment projection 44, which allows the bypass flaps 8 to pivot away only in one direction (specifically away from the abutment projection 44), but prevents such pivoting in the other direction (specifically toward the abutment projection 44). The bypass flaps 8 can be fixed in the bypass duct 7 by suitable preloading means (not shown).

LIST OF REFERENCE DESIGNATIONS

1 Vibration damper
2 Piston
3 Piston rod
4 Base
5 Cylindrical side wall
6 Dimensionally stable movable cover
7 Bypass duct
8 Bypass flap
9 Connecting leadthrough between the two pilot-control chambers
10 Cylinder barrel
11 First working chamber
12 First fluid leadthrough
13 First valve assembly
14 First valve disk
15 First valve seat
16 First pilot-control chamber
17 Connecting leadthrough between second working chamber 21 and first pilot-control chamber 16
18 Vestibule
19 Non-return disk
20 One-way valve
21 Second working chamber
22 Second fluid leadthrough
23 Second valve assembly
24 Second valve disk
25 Second valve seat
26 Second pilot-control chamber
27 Fluid leadthrough between first working chamber 11 and second pilot-control chamber 26
28 Ring-shaped seal
31 Pilot-control valve
32 Valve body
33 Valve seat
34 First side region, surrounded by valve seat
35 Second side region, not surrounded by valve seat
36 Abutment surface on bypass flap
37 Abutment surface on piston
40 Magnetic actuator
42 Fastening journal
43' Piston-rod-facing side of the piston
43" Piston-rod-averted side of the piston
44 Abutment projections arranged in the bypass duct
A Cylinder barrel axis
R Actuation direction
B Throughflow direction through bypass duct
S Axis of rotation

What is claimed is:

1. A regulable vibration damper comprising:
a cylinder barrel that contains a hydraulic fluid in a sealed manner;
a piston that is movable axially along a cylinder barrel axis within the cylinder barrel, the piston dividing the cylinder barrel into a first working chamber and a second working chamber, wherein the piston comprises a first fluid leadthrough and a second fluid leadthrough by way of which the first and second working chambers are connected;
a piston rod disposed parallel to the cylinder barrel axis and connected to the piston;
a first valve assembly for damping piston movement in a first actuation direction disposed at the first fluid leadthrough;
a second valve assembly for damping piston movement in a second actuation direction disposed at the second fluid leadthrough, wherein each of the first and second valve assemblies comprises:
a valve seat, and
a valve disk that is seated on the valve seat in a closed valve position and at least partially covers the respective first or second fluid leadthrough, wherein the valve disk is spaced apart from the valve seat in an open valve position, wherein the valve seat, the valve disk, and the piston delimit a vestibule into which the respective first or second fluid leadthrough leads to an outlet side; and
wherein the piston further comprises:
a bypass duct with throughflow cross sections of different size for two throughflow directions, the bypass duct forming a fluidic connection between the first and second working chambers that bypasses the vestibules, or
a plurality of bypass ducts, wherein throughflow cross sections of each of the plurality of bypass ducts are of different size for the two throughflow directions, the plurality of bypass ducts forming fluidic connections between the first and second working chambers that bypass the vestibules,
wherein openings of the bypass duct or the plurality of bypass ducts are at least partially covered by non-return disks that are separate from the valve disks and wherein the different size throughflow cross sections of the openings of the bypass duct or bypass ducts are defined by the size and shape of the corresponding non-return disk.

2. The regulable vibration damper of claim 1 wherein a first opening of the bypass duct on a first side of the piston is covered to a first extent with a first non-return disk.

3. The regulable vibration damper of claim 2 wherein a second opening of the bypass duct on a second side of the piston is covered to a second extent with a second non-return disk, wherein the first extent is different than the second extent.

4. The regulable vibration damper of claim 1 wherein the throughflow cross sections of different size for the two throughflow directions are realized by an opening of the bypass duct or openings of the bypass ducts at two sides of the piston being covered to different extents by corresponding non-return disks.

5. The regulable vibration damper of claim 1 further comprising:
    an opening of the first or second fluid leadthrough disposed at least one of a piston-rod-facing side or a piston-rod-averted side of the piston, wherein the opening is surrounded by one of the valve seats; and
    an inlet opening of the bypass duct disposed at the at least one of a piston-rod-facing side or a piston-rod-averted side of the piston, wherein the inlet opening is not surrounded by the one of the valve seats.

6. The regulable vibration damper of claim 1 further comprising a non-return disk for limiting one of the throughflow cross sections, the non-return disk disposed coaxially and axially offset with respect to one of the valve disks, wherein the non-return disk and the one of the valve disks are disposed at a same side of the piston.

7. The regulable vibration damper of claim 1 further comprising circumferential regions distributed in a circumferential direction on one side of the piston, wherein at least a first region of the circumferential regions is surrounded by one of the valve seats and a second region of the circumferential regions is not surrounded by the one of the valve seats, wherein openings of the bypass ducts are disposed in the second region.

8. The regulable vibration damper of claim 1 further comprising a non-return disk that reduces one of the throughflow cross sections in one of the throughflow directions, wherein the non-return disk comprises a radially projecting bypass flap.

9. The regulable vibration damper of claim 1 further comprising a non-return disk that reduces one of the throughflow cross sections in one of the throughflow directions, wherein the non-return disk comprises radially projecting bypass flaps.

10. The regulable vibration damper of claim 1 further comprising a non-return disk that is selectively mountable by way of both sides on the piston such that
    a single bypass flap reduces one of the throughflow cross sections of the bypass duct, or
    multiple bypass flaps reduce the throughflow cross sections of the plurality of bypass ducts.

11. The regulable vibration damper of claim 1 further comprising bypass flaps that reduce the throughflow cross sections of the plurality of bypass ducts, each of the bypass flaps having an abutment surface for orienting a non-return disk with respect to a positioning element of the piston.

12. The regulable vibration damper of claim 1 wherein each of the first and second valve assemblies further comprises a pilot control chamber, wherein the valve disk is preloadable into the closed valve position by pressurization of the pilot-control chamber, wherein pressures in the respective pilot-control chambers can be set by at least one pilot-control valve.

* * * * *